(12) United States Patent
Morrow

(10) Patent No.: US 7,880,087 B2
(45) Date of Patent: Feb. 1, 2011

(54) TONEABLE CONDUIT WITH LOOSE TONING SIGNAL WIRE

(75) Inventor: Jason Morrow, Taylorsville, NC (US)

(73) Assignee: CommScope, Inc. of North Carolina, Hickory, NC (US)

( * ) Notice: Subject to any disclaimer, the term of this patent is extended or adjusted under 35 U.S.C. 154(b) by 295 days.

(21) Appl. No.: 12/144,353

(22) Filed: Jun. 23, 2008

(65) Prior Publication Data
US 2009/0314513 A1    Dec. 24, 2009

(51) Int. Cl.
*H02G 3/04* (2006.01)
(52) U.S. Cl. .................. 174/68.1; 174/98; 174/481
(58) Field of Classification Search .................. 174/48, 174/98, 68.1, 68.3, 97, 72 R, 112, 480, 110 R, 174/36; 138/104, 110, 132, 140; 248/68.1; 52/287.1; 324/326, 66, 67
See application file for complete search history.

(56) References Cited

U.S. PATENT DOCUMENTS

| | | | | |
|---|---|---|---|---|
| 2,647,160 | A | * | 7/1953 | Hood ........................... 174/98 |
| 2,772,237 | A | | 11/1955 | Rosel |
| 3,086,557 | A | | 4/1963 | Peterson |
| 3,367,370 | A | * | 2/1968 | Sherlock ..................... 138/104 |
| 3,383,456 | A | * | 5/1968 | Kosak ........................ 174/68.1 |
| 3,555,170 | A | | 1/1971 | Petzetakis |
| 3,580,983 | A | | 5/1971 | Jackson |
| 3,713,947 | A | * | 1/1973 | Hawkins ..................... 156/293 |
| 3,748,371 | A | * | 7/1973 | Krook et al. .............. 174/70 R |
| 4,109,941 | A | | 8/1978 | Wood et al. |
| 4,817,673 | A | | 4/1989 | Zoghby et al. |
| 5,006,806 | A | | 4/1991 | Rippingale et al. |
| 5,017,873 | A | | 5/1991 | Rippingale et al. |
| 5,045,368 | A | | 9/1991 | Cosman et al. |
| 5,051,034 | A | | 9/1991 | Goodman |
| 5,061,823 | A | | 10/1991 | Carroll |
| 5,114,517 | A | | 5/1992 | Rippingale et al. |
| 5,212,349 | A | * | 5/1993 | Pelzer ........................ 174/98 |
| 5,227,103 | A | | 7/1993 | Muschiatti |
| 5,243,128 | A | | 9/1993 | Marcoz |

(Continued)

FOREIGN PATENT DOCUMENTS

DE    2248441    4/1974

(Continued)

OTHER PUBLICATIONS

Article from www.duraline.com regarding tracer product dated Aug. 8, 2001.

(Continued)

*Primary Examiner*—William H Mayo, III
(74) *Attorney, Agent, or Firm*—Muncy, Geissler, Olds & Lowe, PLLC

(57) ABSTRACT

A toneable conduit includes an elongate polymeric tube having a sidewall with an interior surface and an exterior surface. The interior surface defines a main channel. A sub-channel, smaller in cross sectional area than the main channel, extends longitudinally between the exterior and interior surfaces of the tube. A continuous toning signal wire is located within the sub-channel. The sub-channel has a larger cross sectional area than a cross sectional area of the toning signal wire, so that an air gap exists within said sub-channel around portions of the toning signal wire.

20 Claims, 4 Drawing Sheets

U.S. PATENT DOCUMENTS

| | | | |
|---|---|---|---|
| RE34,701 E | 8/1994 | Goodman | |
| 5,415,242 A | 5/1995 | Pelzer | |
| 5,532,598 A | 7/1996 | Clark, Jr. et al. | |
| 5,812,358 A | 9/1998 | Kawai et al. | |
| 5,998,081 A | 12/1999 | Morrison et al. | |
| 6,005,191 A | 12/1999 | Tzeng et al. | |
| 6,053,457 A | 4/2000 | Ozga et al. | |
| 6,068,426 A | 5/2000 | Blanquet et al. | |
| 6,092,558 A * | 7/2000 | Maccario | 138/178 |
| 6,105,649 A | 8/2000 | Levingston et al. | |
| 6,131,265 A | 10/2000 | Bird | |
| 6,135,159 A | 10/2000 | Karl | |
| 6,139,068 A | 10/2000 | Burress et al. | |
| 6,139,957 A | 10/2000 | Craton | |
| 6,933,438 B1 * | 8/2005 | Watts et al. | 174/480 |
| 7,361,835 B2 * | 4/2008 | Morrow et al. | 174/68.1 |
| 2003/0094297 A1 * | 5/2003 | Morrow et al. | 174/48 |

FOREIGN PATENT DOCUMENTS

| | | |
|---|---|---|
| EP | 159307 | 10/1985 |
| EP | 0449795 | 10/1991 |
| GB | 2197419 | 5/1988 |
| JP | 05-106765 | 4/1993 |
| JP | 05-106766 | 4/1993 |
| JP | 05-106779 | 4/1993 |
| RU | 2246068 | 4/2000 |
| WO | WO 96/15894 | 5/1996 |

OTHER PUBLICATIONS

Advertisement by Pyramid Industries, Inc. regarding the Toneable Duct Product. Publication date unknown but prior to Aug. 7, 2001.

* cited by examiner

TONEABLE CONDUIT WITH LOOSE TONING SIGNAL WIRE

BACKGROUND OF THE INVENTION

1. Field of the Invention

The present invention relates to toneable conduit and more particularly to toneable conduit that can be detected by conventional toning equipment.

2. Description of the Related Art

Conduit is often buried to provide an underground path for cables such as coaxial cables and fiber optic cables. In particular, conduit is typically formed of a plastic material that protects the coaxial cables and fiber optic cables from the moisture and other hazards of the underground environment. The cable is typically installed in the conduit by pulling the cable through the installed conduit, although the cable can be provided in the conduit prior to installing the conduit underground.

One issue with conduit is that it can be difficult to locate underground when it is either empty or it contains only non-metallic cables, such as fiber optic cables. As a result, conduit has often been outfitted with a metallic or magnetic strip or wire that allows the conduit to be detected by metal detecting equipment on the ground surface. Although these types of detection devices are useful, they cannot always locate conduit that is buried deep underground (e.g., greater than five feet). Toning equipment is commonly used that operates by transmitting a specific signal along a metallic wire or strip associated with the conduit and detecting the signal from the ground surface using a detector tuned to the specific signal.

One conventional conduit construction that can be detected by conventional metal detection devices and the toning devices discussed above includes an exterior rib that houses the metallic ribbon or wire. For example, Japanese published application JP 5-106765 describes an embodiment that includes an exterior rib including a conductive wire. Although these types of constructions have found use, it is difficult to couple this conduit with another conduit because the exterior rib prevents the connector coupling from fitting flush with the exterior surface of the conduit. As a result, moisture can enter the conduit at the connection and can cause damage to the cable installed therein. In addition, the exterior rib can cause problems during installation in that the exterior rib and associated wire can be ripped off of the conduit if the conduit is being installed by directional boring or plowing methods.

Another conduit construction that is designed to be detected by metal detection devices includes a metallic ribbon or wire that is provided at intermittent lengths. For example, U.S. Pat. No. 6,092,558 describes such an embodiment wherein discrete lengths of a magnetic strip are spaced apart longitudinally along the conduit. U.S. Pat. No. 5,045,368 also describes a similar construction having markers at intervals along the length of the conduit. Although this type of conduit can be detected by the metal detection devices discussed above, it cannot be detected by conventional toning equipment because a signal cannot be transmitted along the conduit.

Alternatively, some conduit constructions use continuous lengths of strip or ribbon formed of metal or a magnetic material to allow the conduit to be detected by metal detecting equipment. For example, U.S. Pat. Nos. 5,051,034 and RE 34,701 describe this type of construction and use a ribbon of magnetic material to allow the conduit to be detected at three to five feet underground. U.S. Pat. Nos. 5,006,086; 5,017,873; and 5,114,517 use a magnetic ribbon that is spirally wound around the exterior surface of the conduit. Although the strip or ribbon in these constructions can be detected by conventional metal detecting equipment, it does not have a suitable construction for transmitting a toning signal for extended distances and at the depths desired in the art.

As demonstrated above, there is a need in the art to provide a conduit that can be detected by toning equipment for extended distances and at the depths desired in the art. In addition, there is a need in the art to provide conduit that can be coupled to provide extended lengths of underground conduit that can be detected by toning equipment.

Applicants' prior U.S. Pat. Nos. 7,279,643 and 7,361,835 and U.S. published applications 2003/0094298 and 2004/0262023 have disclosed a conduit design which addressed one or more of the above noted needs in the prior art. Applicants' U.S. Pat. Nos. 7,279,643 and 7,361,835 and U.S. published applications 2003/0094298 and 2004/0262023 are incorporated herein by reference.

FIG. 1 is a view of a toneable conduit 10 of Applicants' U.S. Pat. No. 7,361,835. The toneable conduit 10 is formed of an elongate polymeric tube that includes a sidewall 12 having a predetermined thickness 14 and further includes an interior surface 16 and an exterior surface 18. The exterior surface 18 is preferably smooth and circular in cross section so that the conduit 10 can be effectively coupled.

The conduit 10 includes a stabilizing rib 20 that extends longitudinally along the interior surface 16 of the conduit 10. The stabilizing rib 20 maintains the wall thickness 14 of the conduit 10, when a toning signal wire 24 that extends longitudinally along the length of the conduit 10, is torn out. The wire 24 runs continuously along the length of the conduit 10 and is embedded within the sidewall 12 of the conduit 10. In particular, the wire 24 is provided completely within the sidewall 12, and extends parallel to a central longitudinal axis A of the elongate polymeric tube of the conduit 10.

The wire 24 is preferably a strong, copper-clad steel wire and can transmit a toning signal along the length of the conduit 10 to allow the conduit 10, if placed underground, to be detected from the surface by toning equipment. The wire 24 is coated with a layer of a non-stick coating composition. The coating composition layer is formed of a material that prevents the wire 24 from adhering to the polymer melt used to form the elongate polymeric tube of the conduit 10.

SUMMARY OF THE INVENTION

Applicants' invention in the background art of FIG. 1 solved several problems of the prior art. For example, the wire 24 could be pulled though the sidewall 12 to permit easy coupling with another conduit or fitting. Further, the non-stick coating described in conjunction with the wire 24 of FIG. 1 allows the wire 24 to be pulled through the sidewall 12 of the conduit 10 without having portions 25 (FIG. 2) of the sidewall 12 adhered to the wire 24. In other words, the non-stick coating of the background art prevents the situation depicted in FIG. 2, wherein the conduit's sidewall 12 would be damaged as the toning signal wire 24 is pulled through it, such that leaks would be more likely to occur.

The Applicant has appreciated one or more drawbacks associated with the conduits of the prior art and Applicants' own background art.

The nonstick coating of the background art permits the wire 24 to be cleanly pulled thorough the sidewall 12 of the conduit 10. However, the channel holding the wire 24 in the sidewall 12 of the conduit 10 does not permit the wire 24 to slide longitudinally within the sidewall. Rather, the wire 24 is essentially embedded within the sidewall 12 during the extrusion process. Moreover, tension placed on the polymeric tube of the conduit 10 which causes elastic deformation in the vicinity of the channel holding the wire 24, causes the channel to clamp down on and hold the wire 24 very tightly, in the same fashion as the common toy known as "Chinese handcuffs." This characteristic of the conduit 10 can lead to a drawback under certain circumstances.

For example, a potential drawback could occur in the storage of the toneable conduit 10. Toneable conduit 10 is typically stored and transported in a coil on a large spool, e.g. a three thousand foot length of conduit 10 on a single spool. Care must be taken when winding the toneable conduit 10 onto the spool, where the toneable conduit 10 has the designs of the background art. These drawbacks will be discussed in combination with FIGS. 3-5, below.

During coiling, the wire 24 must be located at either a three o'clock position or at a nine o'clock position, so that the wire 24 is not subjected to excessive compression or tension forces. As illustrated in FIG. 3, the conduit material forming the sidewall 12 is rather elastic, and portions 27 of the sidewall 12 above the three o'clock-nine o'clock axis B can deform to a slightly thinner state under the tension forces imparted while bending the conduit 10 in the direction C during coiling. Likewise, portions 29 of the sidewall 12 below the three o'clock-nine o'clock axis B can deform to a slightly thicker state under the compression forces imparted while bending the conduit 10 in the direction C during coiling.

The wire 24 must remain basically along the three o'clock—nine o'clock axis because the wire 24 (e.g., a copper-clad steel wire) cannot deform to the degree that the polymeric material of the sidewall 12 can. Materials (e.g., portions of the sidewall 12 and the wire 24) along the three o'clock—nine o'clock axis B do not experience either compression or tension, as the conduit 10 is bent in the direction C during coiling.

The wire 24 can be damaged and the toneable conduit 10 rendered inoperable if the conduit 10 is coiled while the wire 24 is off of the three o'clock—nine o'clock axis B. For example, as illustrated in FIG. 4, if the toneable conduit 10 were bent in the direction C during coiling while the wire 24 is disposed near the twelve o'clock position, the wire 24 would be placed under excessive tension. The wire 24 could break several times and be pulled apart, as indicated at locations 31 and 32.

Further, the tension could cause the wire 24 to tear through the rib 20 and enter the interior of the conduit 10, as indicated at location 33. This could be damaging to the communication cables within the conduit 10 from a physical standpoint and could also influence performance characteristics of an electrical communication cable, such as the crosstalk performance of a twisted pair cable. Moreover, the toneable feature of the conduit 10 is inoperable, if continuity through the wire 24 is lost.

As illustrated in FIG. 5, if the toneable conduit 10 were bent in the direction C during coiling while the wire 24 is disposed near the six o'clock position, the wire 24 would be placed under excessive compression. The wire 24 could break several times and cross over itself, as indicated at locations 34 and 35. At a crossover, the wire 24 could also protrude through the sidewall 12 and into the interior of the conduit 10, as at location 34. At a crossover, the wire 24 could also protrude through the sidewall 12 and to the exterior of the conduit 10, as at location 35. An interior protrusion, as at location 34, could be damaging to the communication cables within the conduit 10 from a physical standpoint and could also influence performance characteristics of an electrical communication cable within the conduit 10. A protrusion to the exterior of the conduit 10 can allow damaging moisture to enter the conduit 10. Moreover, the toneable feature of the conduit 10 is inoperable, if continuity through the wire 24 is lost.

It is also possible to break the wire 24 of the conduit 10 when pulling the conduit 10 during installation. For example, often times a hole is laterally bored through the ground (e.g., under a street) using a boring tool. When the hole is completed by the tool, the end of a conduit 10 is attached to the tool and the tool is withdrawn back through the bored hole, hence pulling the conduit 10 along through the hole.

During the pulling, the conduit 10 may be exposed to high tension forces due to friction within the bored hole. The polymer material of the sidewall 12 of the conduit 10 can elongate to some degree under the tension. However, the wire 24 cannot elongate to the same degree as the sidewall 12. Moreover, the elongation of the sidewall 12 causes the wire 24 to be tightly gripped within its channel in the sidewall 12, in the same manner as "Chinese handcuffs." Hence, the wire 24 will break, and the toneable feature of the conduit 10 will be inoperable. In one study, an elongation of 3 to 4% in the sidewall 12 caused the wire 24 to break, while the polymer material of the sidewall 12 could withstand elongations of up to about 8% without structural damage.

It is also possible that the wire 24 could be damaged, or at least more susceptible to damage, dependent upon the temperature of the conduit 10 during coiling and installation. The wire 24 and the polymer material of the conduit 10 have different coefficients for expansion and contraction based upon temperature. The temperature of the conduit 10 can affect the contraction gripping force applied to the wire 24 during elongation or compression of the polymeric material of the sidewall 12 during coiling and installation.

It is an object of the present invention to address one or more of the drawbacks of the prior art toneable conduits discussed above and/or Applicants' appreciated needs in the art of toneable conduits.

These and other objects are accomplished by a toneable conduit including an elongate polymeric tube having a sidewall with an interior surface and an exterior surface. The interior surface defines a main channel. A sub-channel, smaller in cross sectional area than the main channel, extends longitudinally between the exterior and interior surfaces of the tube. A continuous toning signal wire is located within the sub-channel. The sub-channel has a larger cross sectional area than a cross sectional area of the toning signal wire, so that an air gap exists within said sub-channel around portions of the toning signal wire.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limits of the present invention, and wherein.

DETAILED DESCRIPTION OF THE INVENTION

Figure 1:
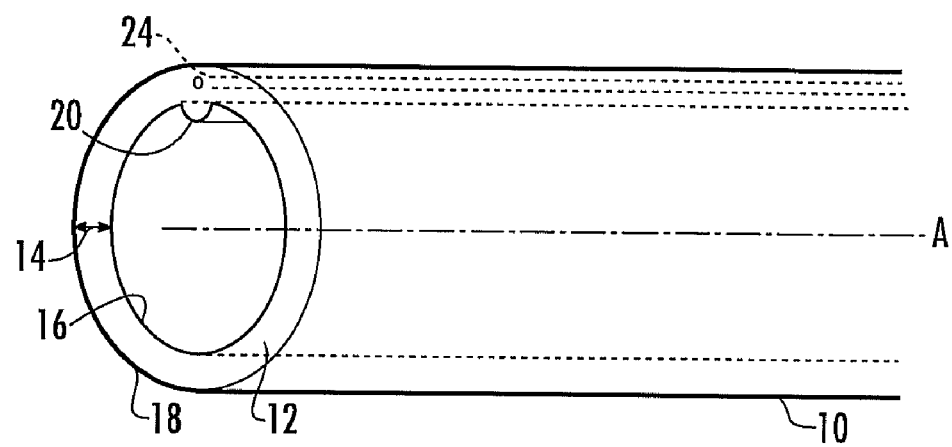
FIG. 1 is a perspective view of an end of a toneable conduit with a toning signal wire in a sidewall, in accordance with the background art.
Figure 2:
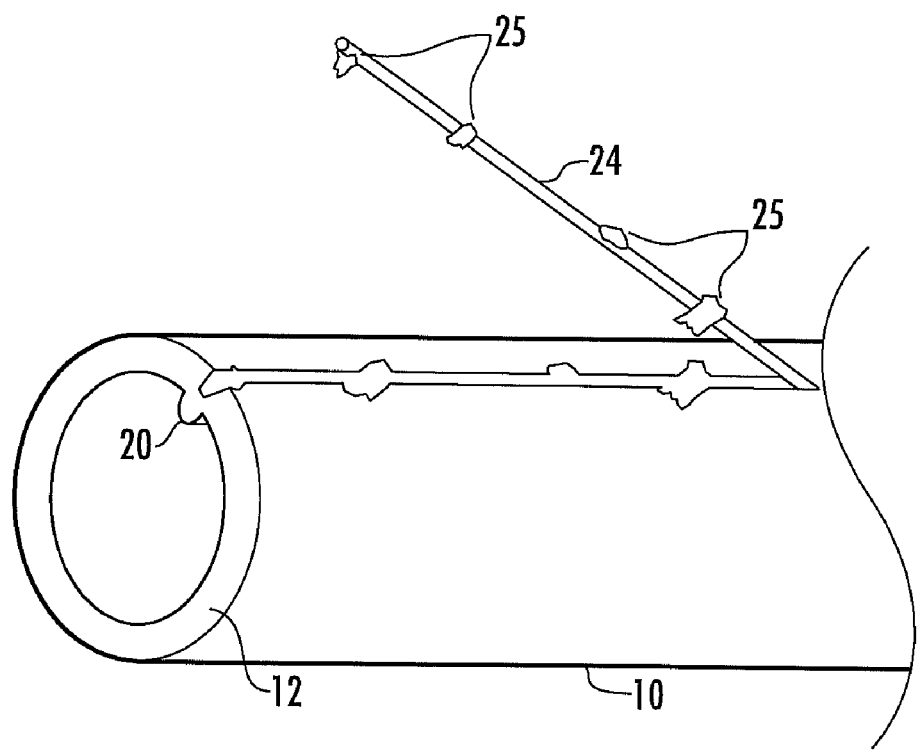
FIG. 2 is a perspective view of the conduit of FIG. 1 with a toning signal wire torn from the sidewall of the conduit, demonstrating a downside of not providing a non-stick coating on the wire.
Figure 3:
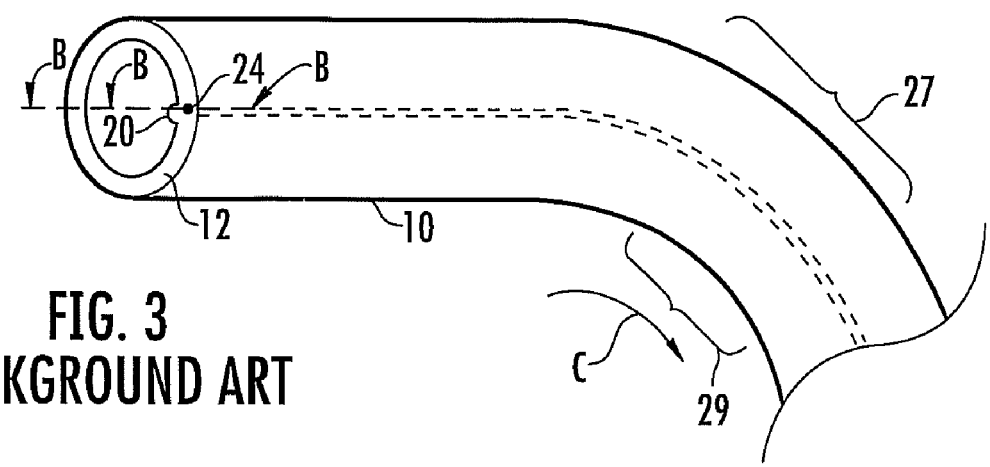
FIG. 3 is a perspective view of a section of the toneable conduit of FIG. 1 undergoing a bend with the toning signal wire at a three o'clock position.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Figure 6:
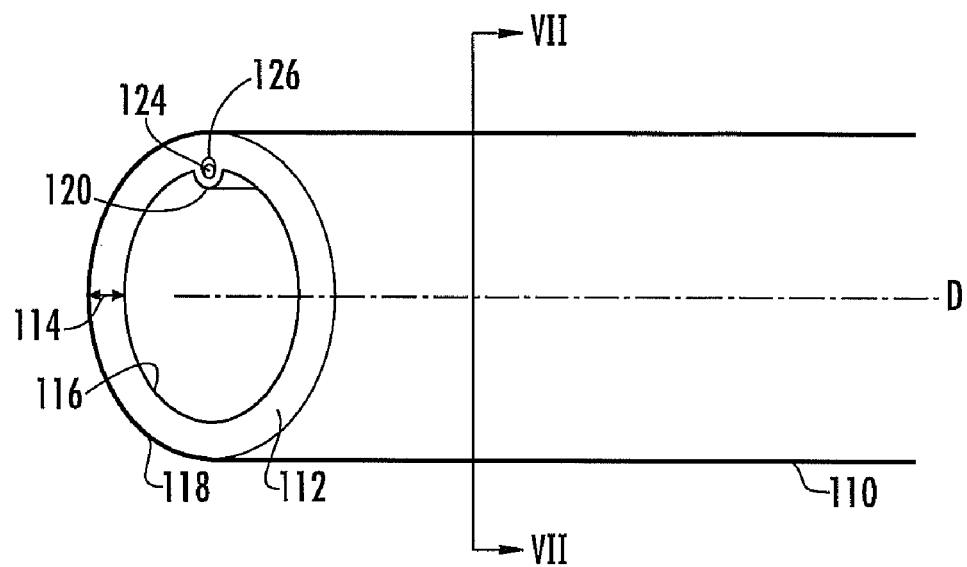
FIG. 6 a perspective view of an end of a toneable conduit with a toning signal wire in a sidewall, in accordance with the present invention.

FIG. 6 is a perspective view of an end of a toneable conduit with a toning signal wire in a sidewall, in accordance with the present invention. The toneable conduit 110 is formed of an elongate polymeric tube that includes a sidewall 112 having a predetermined thickness 114. The toneable conduit 110 extends longitudinally along an axis D.

Figure 7:
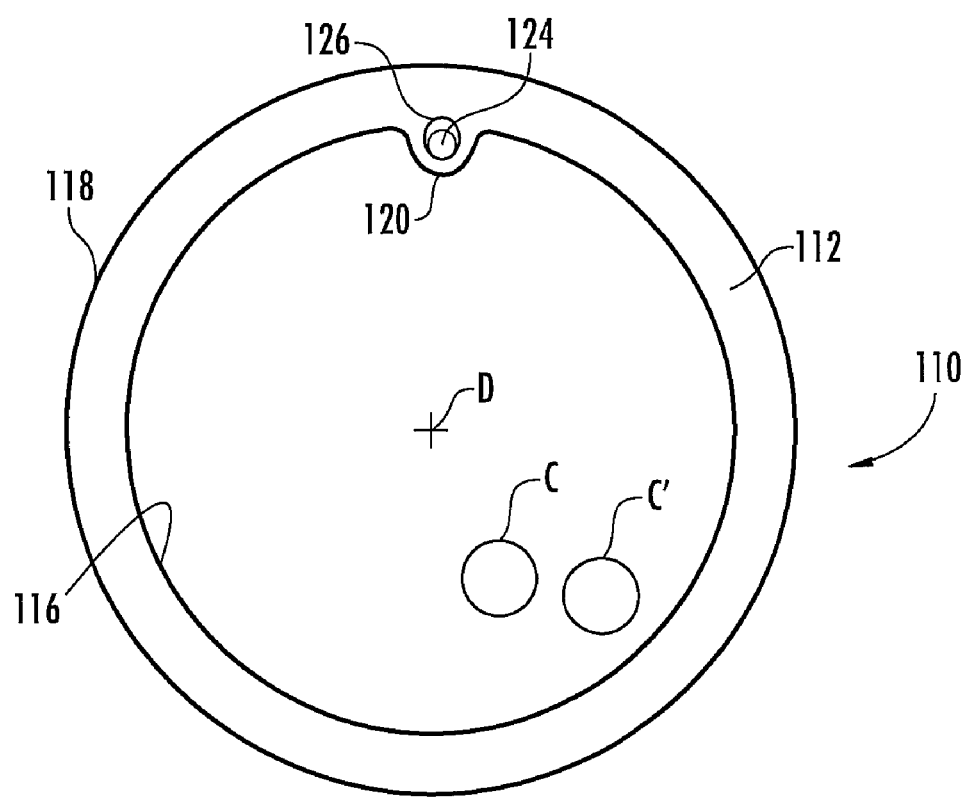
FIG. 7 is a cross sectional view taken along line VII-VII in FIG. 6.

As best seen in FIG. 7, the sidewall 112 includes an interior surface 116 and an exterior surface 118. The exterior surface 118 is preferably smooth and substantially circular in cross section, so that the conduit 110 can be effectively coupled. The interior surface 116 forms a main channel within the elongate polymeric tube for accepting at least one communication cable C, C'.

A wire 124 runs continuously along the length of the conduit 110 and is located within the sidewall 112 of the conduit 110 in a sub-channel 126. The sub-channel 126 may be integrally formed with the sidewall 112 and may be located between the interior surface 116 and the exterior surface 118 of the sidewall 112. In one embodiment, the sub-channel 126 is substantially circular in cross section and has a cross sectional area which is much smaller than a cross sectional area of the main channel. For example, the diameter of the sub-channel 126 could be about 0.12 inches, wherein the main channel could have a diameter on the order of 1.4 inches.

The wire 124 is provided loosely within the sub-channel 126 so that it may slide longitudinally therein. The wire 124 extends parallel to the central longitudinal axis D of the elongate polymeric tube of the conduit 110. The wire 124 preferably functions as a toning signal wire 124 and is electrically conductive from a first end of the toneable conduit 110 to a second end of said toneable conduit 110. The toning signal wire 124 has a cross sectional area which is substantially less than a cross sectional area of the sub-channel 126, so that an air gap exists within the sub-channel 126 around portions of the wire 124, as best seen in the cross section view of FIG. 7.

In a preferred embodiment, a cross sectional area of the sub-channel 126 is at least about 25% larger than a cross sectional area of the toning signal wire 124. In a more preferred embodiment, the cross sectional area of the sub-channel 125 is at least about 33% larger than the cross sectional area of the toning signal wire 124. In a most preferred embodiment, the cross sectional area of said sub-channel 126 is at least about 45% larger than the cross sectional area of the toning signal wire 124.

The wire 124 is preferably a strong, copper-clad steel wire 124 and can transmit a toning signal along the length of the conduit 110 to allow the conduit 110 when buried to be detected from the ground surface by toning equipment. In one embodiment, the toning signal wire 124 is twenty gauge or larger, such as an eighteen gauge wire (i.e., 0.0403 inches in diameter).

In one embodiment, the exterior surface 118 of the toneable conduit 110 has a diameter of about 1.66 inches, and the interior surface 116 of the toneable conduit 110 has a diameter of about 1.40 inches.

The interior surface 116 protrudes inwardly toward the center D of the elongated tube of the conduit 110 immediately below the sub-channel 126 to form an interior surface 116 with a rib 120. The rib 120 may facilitate the installation of the cables C, C' within the main channel of said toneable conduit 110 by reducing friction as the cables C, C' are pulled into the conduit 110.

In one embodiment, the wire 124 is coated with a layer of a non-stick coating composition. The coating composition layer is formed of a material that prevents the wire 124 from adhering to the polymer melt used to form the toneable conduit 110. For example, the wire 124 would be coated with a material, which would not stick to a polyethylene material, used to form the elongate polymeric tube of the conduit 110. In one embodiment, the wire 124 may include a layer of polytetrafluoroethylene. In a more preferred embodiment, the wire 124 is coated with silicone grease, polytetrafluoroethylene, or a combination of both substances. However, it should be noted that other non-stick substances, such as PVC and polypropylene, may be employed. The wire 124, once coated, may assume a larger diameter, such as about 0.058 inches in diameter.

Figure 8:
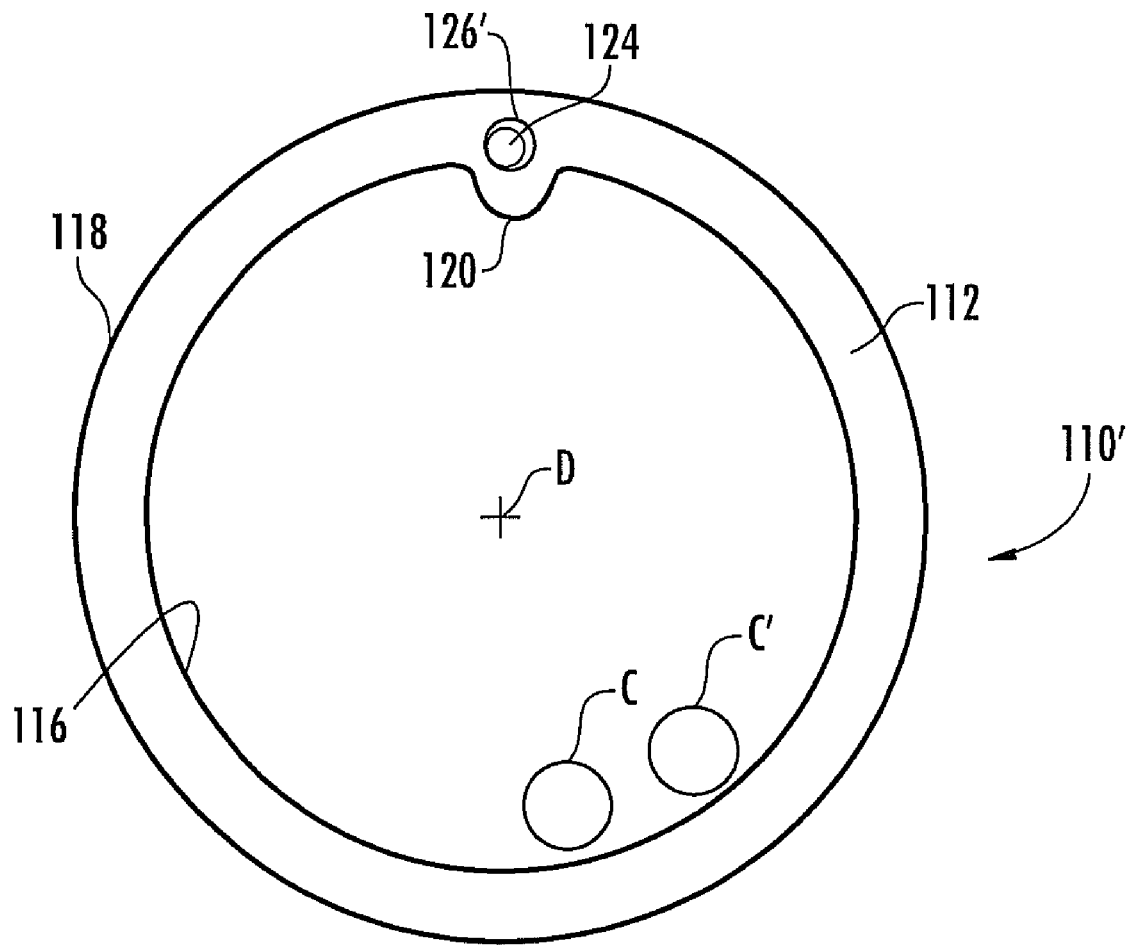
FIG. 8 is a cross sectional view similar to FIG. 7, but illustrating an alternative embodiment.

FIG. 8 is a cross sectional view similar to FIG. 7, but illustrating an alternative embodiment of the toneable conduit 110'. Like elements have been labeled with the same reference numerals. FIG. 8 illustrates that the sub-channel 126 of FIG. 7 may be repositioned within the sidewall 112. In FIG. 8, the sub-channel 126' is located closer to the exterior surface 118 of the sidewall 112. Locating the sub-channel 126' and its wire 124 closer to the exterior surface 118 can be beneficial when it is necessary to remove the wire 124 from sidewall 112 during coupling.

To remove the wire 124 from the sidewall 112 for coupling, one could cut way the sidewall 112, while being careful not to cut the wire 124. Alternative, one could insert one jaw of a long nose vise grip tool a few inches into the end of the toneable conduit 110 and tightly clamp a portion of the rib 120 toward the exterior surface 118, upon which the mating jaw of the vise grip tool resides. Then, the wire 124 could be torn through the sidewall 112 in accordance with the procedures disclosed in Applicants' prior U.S. Pat. Nos. 7,279,643 and 7,361,835 and U.S. published applications 2003/0094298 and 2004/0262023, which are incorporated herein by reference.

The method of making the toneable conduit 110 may be preformed in accordance with the disclosures found in Applicants' prior U.S. Pat. Nos. 7,279,643 and 7,361,835 and U.S. published applications 2003/0094298 and 2004/0262023. However, the sub-channel 126 is oversized relative to the wire 124, so as to produce an air gap around at least a portion of the wire 124.

For example, the method includes extruding an elongate polymeric tube having a sidewall 112 with the interior surface 116 and the exterior surface 118. The interior surface 116 defines the main channel of the toneable conduit 110. The sub-channel 126 is also formed during the extruding step of forming the sidewall 112. The sub-channel 126 has a smaller cross sectional area than the main channel, and extends longitudinally alongside the interior surface 116 of the elongate polymeric tube. For example, the sub-channel 126 may extend parallel to the axis D.

The method further includes feeding the continuous conductive wire 124 into the sub-channel 126 during the extrusion process. A cross sectional area of the sub-channel 126 is formed larger than a cross sectional area of the continuous wire 124, so that an air gap exists within the sub-channel around 126 outer surfaces of the continuous wire 124.

Figure 4:
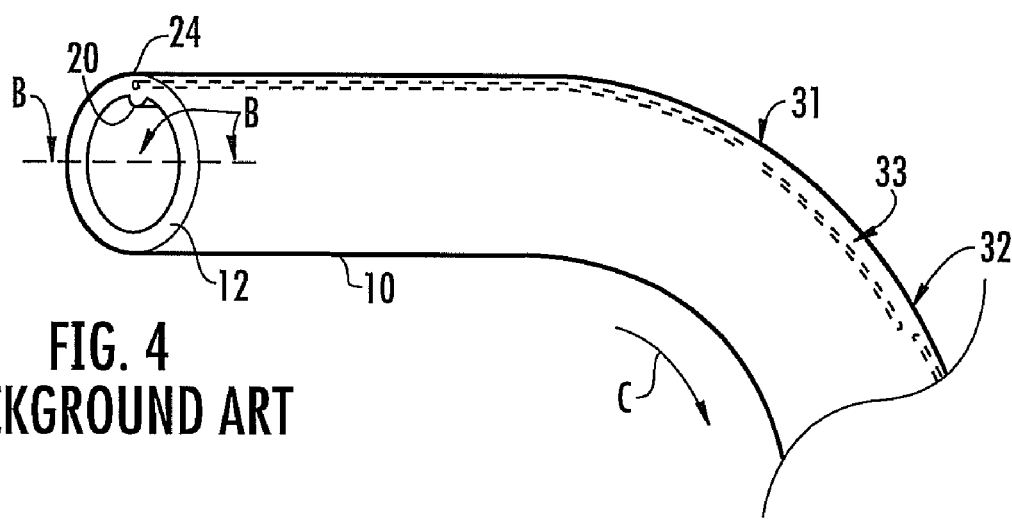
FIG. 4 is a perspective view of a section of the toneable conduit of FIG. 1 undergoing a bend with the toning signal wire at a twelve o'clock position.
Figure 5:
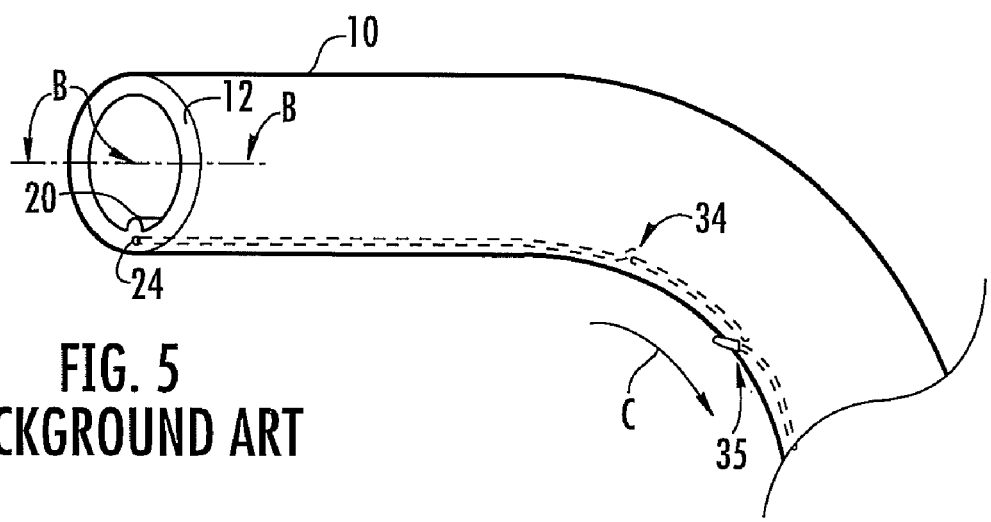
FIG. 5 is a perspective view of a section of the toneable conduit of FIG. 1 undergoing a bend with the toning signal wire at a six o'clock position.

By the above configuration, the wire 124 is free to slide longitudinally within the sub-channel 126 under certain circumstances. Therefore, compression and tension forces placed upon the toneable conduit 110 will not directly pass to the wire 124 under certain circumstances. For example, if the portion of the sidewall 112 containing the sub-channel 126 in the last few hundred feet of the toneable conduit 110 is placed under tension, as illustrated in the bending scenario of FIG. 4, the wire 124 will recede/withdraw into the end of sub-channel 126, rather then being broken and pull apart, as in the background art. Also, if the portion of the sidewall 112 containing the sub-channel 126 in the last few hundred feet of the toneable conduit 110 is placed under compression, as illustrated in the bending scenario of FIG. 5, the wire 124 will protrude from the end of sub-channel 126, rather then being broken and overlapping itself, as in the background art.

Another advantage of the present invention occurs when the toneable conduit 110 is being pulled through a bored hole, the sidewall 112 of the toneable conduit 110 can be elastically deformed to a much greater extent, as compared to the background art, before the sub-channel 126 will clamp down on the wire 124. In the Chinese handcuffs analogy, it would be akin to the functioning of the handcuffs on adult fingers versus smaller children's fingers. The handcuff would need to be pulled or elongated further before the children's fingers would be clamped by the cuffs.

In the background art an elongation of the sidewall 12 of perhaps 3 to 4% resulted in the breaking of the wire 24. In the structures of the present invention, the elongation of the sidewall 112 could be perhaps 5 to 6% before the wire 124 is broken. Indeed, if the cross section of the sub-channel 126 is large enough as compared to the cross section of the wire 124, it would be possible that the elongation of the sidewall 112 could reach its failure point (e.g., about 8%) prior to breaking of the wire 124 within the sub-channel 126.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

I claim:

1. A toneable conduit comprising:
   a polymer material forming an elongated tube;
   a main channel formed within said elongated tube for accepting at least one communication cable;
   a sub-channel formed within said elongated tube; and
   a toning signal wire resident within said sub-channel, said toning signal wire being electrically conductive from a first end of said toneable conduit to a second end of said toneable conduit, and said toning signal wire having a cross sectional area which is substantially less than a cross sectional area of said sub-channel.

2. The toneable conduit according to claim 1, wherein said sub-channel is integrally formed with a sidewall defining said main channel.

3. The toneable conduit according to claim 2, wherein said sidewall defining said main channel includes an exterior surface and an interior surface, and wherein said sub-channel resides between said exterior surface and said interior surface.

4. The toneable conduit according to claim 3, wherein said interior surface protrudes inwardly toward a center of said elongated tube immediately below said sub-channel to form an interior surface with a rib to facilitate the installation of cables within said main channel of said toneable conduit.

5. The toneable conduit according to claim 1, wherein a cross sectional area of said sub-channel is at least about 25% larger than a cross sectional area of said toning signal wire.

6. The toneable conduit according to claim 1, wherein a cross sectional area of said sub-channel is at least about 33% larger than a cross sectional area of said toning signal wire.

7. The toneable conduit according to claim 1, wherein a cross sectional area of said sub-channel is at least about 45% larger than a cross sectional area of said toning signal wire.

8. The toneable conduit according to claim 1, wherein said toning signal wire is coated with a coating composition that prevents said toning signal wire from adhering to said polymer material of said elongated tube.

9. The toneable conduit according to claim 1, wherein said toning signal wire includes a layer of polytetrafluoroethylene.

10. The toneable conduit according to claim 1, wherein said toning signal wire is coated with silicone grease.

11. The toneable conduit according to claim 1, wherein said toning signal wire is eighteen gauge.

12. The toneable conduit according to claim 1, wherein said toning signal wire is a copper-clad steel wire.

13. The toneable conduit according to claim 1, wherein said polymer material is high density polyethylene.

14. The toneable conduit according to claim 1, wherein an exterior surface of said elongated tube presents a substantially circular cross section.

15. The toneable conduit according to claim 1, wherein said sub-channel is substantially circular in cross section.

16. A toneable conduit, comprising:
an elongate polymeric tube having a sidewall with an interior surface and an exterior surface, said interior surface defining a main channel of said toneable conduit;
a sub-channel, smaller in cross sectional area than said main channel, extending longitudinally alongside said interior surface of said elongate polymeric tube; and
an electrically continuous wire located within said sub-channel, wherein said wire is capable of transmitting a toning signal to allow said toneable conduit to be detected by toning equipment, and wherein said sub-channel has a larger cross sectional area than a cross sectional area of said wire, so that an air gap exists within said sub-channel around. portions of said wire.

17. The toneable conduit according to claim 16, wherein said sub-cannel resides between said exterior surface and said interior surface.

18. The toneable conduit according to claim 17, wherein said interior surface protrudes inwardly toward a center of said elongate polymeric tube immediately below said sub-channel to form an interior surface with a rib to facilitate the installation of cables within said main channel of said toneable conduit.

19. The toneable conduit according to claim 16, wherein said wire is coated with a coating composition that prevents said wire from adhering to a polymer material used to form said elongate polymeric tube.

20. A method of forming toneable conduit comprising:
extruding an elongate polymeric tube having a sidewall with an interior surface and an exterior surface, wherein the interior surface defines a main channel of the toneable conduit;
forming a sub-channel during said extruding step, wherein the sub-channel has a smaller cross sectional area than the main channel, and extends longitudinally alongside the interior surface of the elongate polymeric tube; and
feeding a continuous conductive wire into the sub-channel during said extruding step, wherein a cross sectional area of the sub-channel is formed larger than a cross sectional area of the continuous wire, so that an air gap exists within the sub-channel around portions of the continuous wire.

* * * * *